(12) United States Patent
Yurusov

(10) Patent No.: US 11,544,403 B2
(45) Date of Patent: Jan. 3, 2023

(54) SYSTEM AND METHOD FOR DECENTRALIZED DATA STORAGE

(71) Applicant: MediCapture, Inc., Plymouth Meeting, PA (US)

(72) Inventor: Alexander Yurusov, New Taipei (TW)

(73) Assignee: MediCapture, Inc., Plymouth Meeting, PA (US)

( * ) Notice: Subject to any disclaimer, the term of this patent is extended or adjusted under 35 U.S.C. 154(b) by 142 days.

(21) Appl. No.: 16/967,976

(22) PCT Filed: Feb. 6, 2019

(86) PCT No.: PCT/US2019/016861
§ 371 (c)(1),
(2) Date: Aug. 6, 2020

(87) PCT Pub. No.: WO2019/157062
PCT Pub. Date: Aug. 15, 2019

(65) Prior Publication Data
US 2021/0034780 A1    Feb. 4, 2021

Related U.S. Application Data

(60) Provisional application No. 62/627,456, filed on Feb. 7, 2018.

(51) Int. Cl.
*G06F 21/60* (2013.01)
*G06F 21/78* (2013.01)
*G06F 21/62* (2013.01)
*H04L 9/14* (2006.01)

(52) U.S. Cl.
CPC ........ *G06F 21/6245* (2013.01); *G06F 21/602* (2013.01); *G06F 21/606* (2013.01); *G06F 21/78* (2013.01); *G06F 2221/2107* (2013.01)

(58) Field of Classification Search
CPC .. G06F 21/6245; G06F 21/602; G06F 21/606; G06F 21/78; G06F 2221/2107
See application file for complete search history.

(56) References Cited

U.S. PATENT DOCUMENTS

| | | | |
|---|---|---|---|
| 10,476,662 B2 * | 11/2019 | Yuan | H04L 9/0618 |
| 2007/0006322 A1 | 1/2007 | Karimzaeh et al. | |
| 2009/0077390 A1 | 3/2009 | Cobelo et al. | |
| 2013/0290703 A1 | 10/2013 | Resch et al. | |

(Continued)

OTHER PUBLICATIONS

DROPS: Division and Replication of Data in Cloud for Optimal Performance and Security. Ali. IEEE. (Year: 2015).*

(Continued)

*Primary Examiner* — Venkat Perungavoor
(74) *Attorney, Agent, or Firm* — Kaplan Breyer Schwarz, LLP

(57) ABSTRACT

A system and method for the decentralized storage of data is provided that pre-processes data files to generate multiple subsets of encrypted data that includes randomly selected portions of data from different data files. The subsets of encrypted data are then transmitted to multiple remote servers that are randomly chosen for each subset of encrypted data. The local encryption key that was used to encrypt the data is required to reconstruct the data file. The system and method is particularly suited for the decentralized storage of medical data.

18 Claims, 6 Drawing Sheets

(56) References Cited

U.S. PATENT DOCUMENTS

| | | |
|---|---|---|
| 2015/0154418 A1 | 6/2015 | Redberg |
| 2016/0085996 A1* | 3/2016 | Eigner ................ G06F 21/6227 |
| | | 713/193 |
| 2016/0241525 A1* | 8/2016 | Klum .................. G06F 11/1464 |
| 2017/0048021 A1 | 2/2017 | Yanovsky et al. |
| 2017/0098096 A1 | 4/2017 | Redberg |
| 2017/0104736 A1 | 4/2017 | Seul et al. |
| 2017/0277574 A1* | 9/2017 | Anami ................ G06F 11/1464 |
| 2019/0156045 A1* | 5/2019 | Lewis ................ H04L 63/0428 |
| 2021/0286884 A1* | 9/2021 | Lewis .................... H04L 63/08 |

OTHER PUBLICATIONS

Adding long-term availability, obsfucation, encryption to multi-cloud storage systems. Celesti. Elsevier.(Year: 2016).*

A Hybrid Approach of Secret Sharing with Fragmentation and Encryption in Cloud Environment for Securing Outsourced Medical Database: A Revultionary Approach. Le. Rivers Publishers.(Year: 2018).*

A distributed framework for health exchange using smartphone techonologies. Abdulnabi. Elsevier. (Year: 2017).*

Extended European Search Report issued in EP patent application No. 19751013.4, dated Oct. 1, 2021, 9 pp.

Authorized Officer: Shane Thomas, International Search Report and Written Opinion issued in corresponding PCT application No. PCT/US2019/016861, dated Apr. 24, 2019, 15 pp.

\* cited by examiner

SYSTEM AND METHOD FOR DECENTRALIZED DATA STORAGE

STATEMENT OF RELATED CASES

This application claims priority to U.S. Provisional Application Ser. No. 62/627,456, filed Feb. 7, 2018, whose entire disclosure is incorporated herein by reference.

FIELD OF THE INVENTION

The present invention relates to secure data storage and, more particularly, to a decentralized data storage system and method that is secure and reduces local data storage requirements.

BACKGROUND OF THE INVENTION

Current medical data storage systems store medical files locally and require large amounts of storage space. Such medical data storage systems are susceptible to loss from power outages, disgruntled employees, hackers, and other network management risks. Current systems require providers to maintain and upgrade local network security for each new threat identified. Further, a single location loss incident can result in the loss of multiple files for multiple patients. Current systems lack the security and redundancy to safely store medical data.

SUMMARY OF THE INVENTION

An object of the invention is to solve at least the above problems and/or disadvantages and to provide at least the advantages described hereinafter.

The present invention provides a system and method for the decentralized storage of data that pre-processes data files to generate multiple subsets of encrypted data that includes randomly selected portions of data from different data files. The subsets of encrypted data are then transmitted to multiple remote servers that are randomly chosen for each subset of encrypted data. The local encryption key that was used to encrypt the data is required to reconstruct the data file. The system and method is particularly suited for the decentralized storage of medical data.

An embodiment of the invention is a system for the decentralized storage of data, comprising a processor; memory accessible by the processor; a set of processor readable instructions stored in the memory that are executable by the processor to: receive a plurality of data files, pre-process the plurality of data files to generate multiple subsets of encrypted data, wherein each subset of encrypted data comprises randomly selected portions of data from different data files, and transmit the multiple subsets of data to multiple remote servers, wherein each subset of data is sent to a randomly selected remote server.

Another embodiment of the invention is a method for the decentralized storage of data, comprising receiving a plurality of data files; pre-processing the plurality of data files to generate multiple subsets of encrypted data, wherein each subset of encrypted data comprises randomly selected portions of data from different data files; and transmitting the multiple subsets of data to multiple remote servers, wherein each subset of data is sent to a randomly selected remote server.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
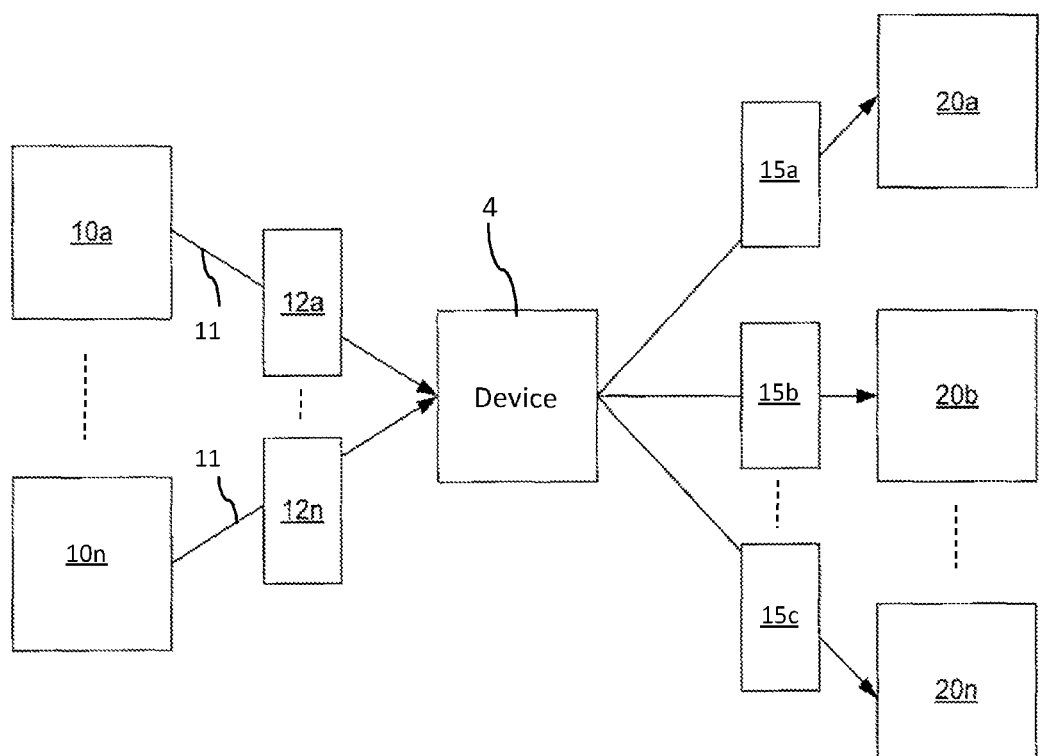
FIG. 1 is a block diagram of a system for the decentralized storage of data, in accordance with an illustrative embodiment of the present invention.

In the following detailed description of various embodiments of the system and method of the present invention, numerous specific details are set forth in order to provide a thorough understanding of various aspects of one or more embodiments. However, the one or more embodiments may be practiced without some or all of these specific details. In other instances, well-known methods, procedures, and/or components have not been described in detail so as not to unnecessarily obscure aspects of embodiments.

Articles "a" and "an" are used herein to refer to one or to more than one (i.e. at least one) of the grammatical object of the article. By way of example, "an element" means at least one element and can include more than one element. Unless otherwise defined, all technical terms used herein have the same meaning as commonly understood by one of ordinary skill in the art to which this disclosure belongs.

The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation.

Terms including "inwardly" versus "outwardly," "longitudinal" versus "lateral" and the like are to be interpreted relative to one another or relative to an axis of elongation, or an axis or center of rotation, as appropriate. Terms concerning electrical attachments, coupling and the like, such as "electrically connected," "electrically coupled," or "in signal communication" refer to a relationship wherein elements are electrically coupled to one another either directly or indirectly through intervening elements and through any combination of wired or wireless communication channels.

The term "module" as used herein means a real-world device, component, or arrangement of components implemented using hardware, which may include an application specific integrated circuit (ASIC) or field-programmable gate array (FPGA), for example, or a processor system and a set of instructions to implement the module's functionality, which (while being executed) transform the processor system into a special-purpose device for carrying out the module's functions.

A module can also be implemented as a combination of hardware alone and software-controlled hardware, with certain functions facilitated by the hardware alone, and other functions facilitated by a combination of hardware and software. In certain implementations, at least a portion, and in some cases, all, of a module can be executed on the processor(s) of a computer or device that executes an operating system, system programs, and application programs, while also implementing the module using multitasking, multithreading, distributed (e.g., cloud) processing, or other such techniques. Examples of such a computer or device include, but are not limited to, a personal computer (e.g., a desktop computer or a notebook computer), a server, an automated teller machine (ATM), a point-of-sale terminal, an appliance, a mobile computing device, such as a smartphone, a tablet, or a personal digital assistant (PDA), a medical digital video recorder, and a medical digital capture device.

While preferred embodiments are disclosed, still other embodiments of the system and method of the present invention will become apparent to those skilled in the art from the following detailed description, which shows and describes illustrative embodiments. As will be realized, the following disclosure is capable of modifications in various obvious aspects, all without departing from the spirit and scope of the present invention. Also, the reference or non-reference to a particular embodiment of the invention shall not be interpreted to limit the scope of the present invention.

A system and method for the decentralized storage of data is disclosed. The system and method is particularly suited for the decentralized storage of medical data, and thus the invention will be described in the context of medical data. However, it should be appreciated that the system and method of the present invention can be used for the decentralized storage of any type of data. Thus, although the term "medical data" is used throughout as an illustrative use of the present invention, it should be understood that any type of data can be substituted for "medical data."

FIG. 1 is a block diagram of a system for the decentralized storage of data, in accordance with one illustrative embodiment of the present invention. The system 2 includes a processor 4 configured to receive data 11 from one or more data sources 10a-10n, such as medical data from or more caregivers, providers, and/or other data generators. In various embodiments, the processor 4 is a processor in a computer, a medical digital video recorder, a medical digital image capture device, etc. If data 11 is medical data, the medical data 11 can include medical files 12a-12n generated by medical providers (such as doctors, specialist, care givers, etc.), medical institutions (such as hospitals, doctor offices, hospice care, etc.), and/or any other suitable data source 10a-10n. The data 11 can be provided from a single source (e.g., source 10a) or can be provided from multiple sources (e.g., sources 10a-10n).

The processor 4 receives the data 11 and pre-processes the data 11. Pre-processing may include, for example, encrypting each of the individual files 12a-12n contained within the data 11 and separating each of the files 12a-12n into multiple, random data portions 15a-15n. The processor 4 transmits one or more data portions 15a-15n for each of a plurality of files 12a-12n to one or more randomly selected remote servers 20a-20n for storage. The remote servers 20a-20n are located at randomly selected geographic locations. Reconstruction of each file within the data is possible only by an entity that possess a local encryption key used during pre-processing. The system 2 reduces local storage requirements by only requiring that local keys and/or other local security measures be stored on the local storage accessed by the processor 4.

Figure 2:
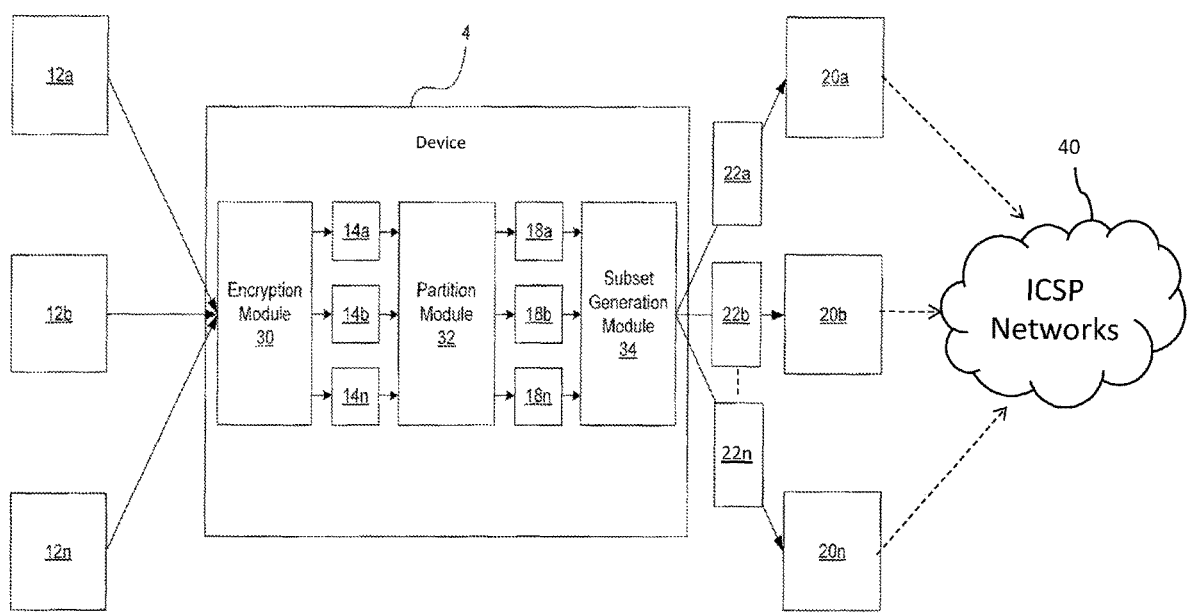
FIG. 2 is a block diagram of a system for the decentralized storage of data, in accordance with another illustrative embodiment of the present invention.

FIG. 2 is a block diagram of a system for the decentralized storage of data, in accordance with another illustrative embodiment of the present invention. In the embodiment of FIG. 2, the device 4 includes an encryption module 30, a partition module 32 and a subset generation module 34.

Figure 3:
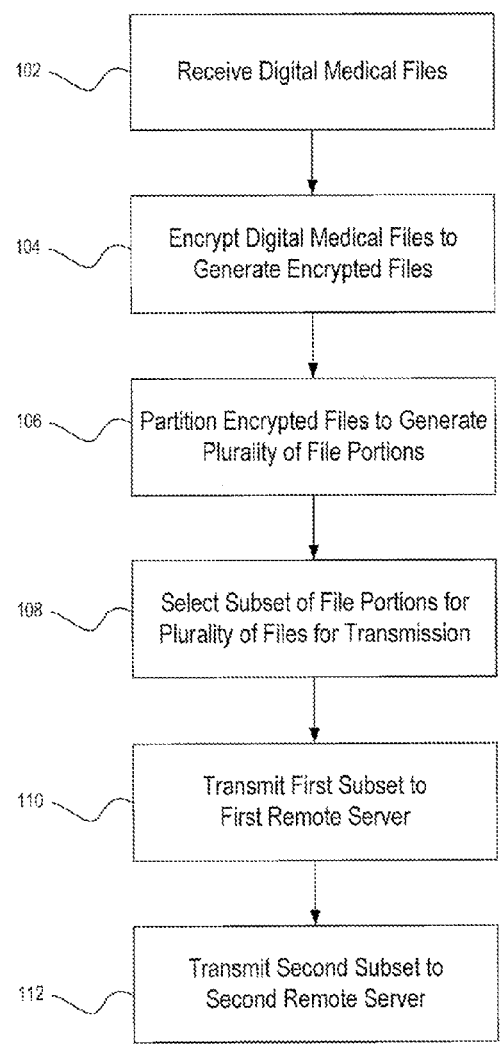
FIG. 3 is a flowchart of a method for the decentralized storage of date, in accordance with an illustrative embodiment of the present invention.

FIG. 3 is a flowchart of a method for the decentralized storage of medical data, in accordance with an illustrative embodiment of the present invention. The method can be implemented with the system of FIG. 2 and will be discussed with reference to FIG. 2.

The method starts at step 102, in which the encryption module 30 receives digital medical files 12a-12n. Then, at step 104, the encryption module 30 generates a plurality of encrypted files 14a-14n. Each of the encrypted files 14a-14n may be generated by applying an encryption key to each of the received digital medical files 12a-12n. The encryption key may be a local encryption key stored in memory, a network encryption key received from a networked storage module (not shown), a generated encryption key generated according to one or more rules, and/or any other suitable encryption key.

In some embodiments, the same encryption key is applied to each of the digital medical files 12a-12n received by the encryption module 30. In other embodiments, two or more encryption keys may be applied to selected subsets of the digital medical files 12a-12n. For example, in some embodiments, an encryption key may be selected from a plurality of encryption keys based on user identification data, client identification data, practice group identification data, coding data, location data, and/or any other suitable data associated with and/or stored within the received digital medical files 12a-12n.

The plurality of encrypted files 14a-14n may be generated by the encryption module 30 using any suitable encryption algorithm. For example, in various embodiments, the plurality of encrypted files 14a-14n can be generated by one or more of a symmetric cryptographic algorithm, a asymmetric cryptographic algorithm (e.g., public/private key cryptography), hash algorithms, key exchange algorithms, and/or any other suitable encryption algorithms Examples of suitable known algorithms can include, but are not limited to, triple DES/3DES (data encryption standard), RSA (Rivest-Shamir-Adleman), AES (Advanced Encryption Standard), Blowfish, Twofish, MD5, SHA (Secure Hash Algorithm), and/or HMAC (Hash-based Message Authentication Code).

At step 106, the partition module 32 partitions each encrypted file 14a-14n into a plurality of file portions 18a-18n. Each of the file portions 18a-18n contain a portion of the encrypted file 14a-14n. The file portions 18a-18n each include a random size and contain a random portion of the digital medical file 12. In some embodiments, the number of file portions 18a-18n generated is randomized for each encrypted file 14a-14n.

It should be appreciated that, although FIGS. 2 and 3 describe a process by which the digital medical files 12a-12n are first encrypted by the encryption module 30, then partitioned by the partition module 32, the digital media files 12a-12n could be partitioned by the partition module 32 prior to encryption, and then the partitioned files could be encrypted by the encryption module 30.

At step 108, the subset generation module 34 generates subsets 22a-22n of file portions 18a-18n for transmission to remote servers 20a-20n. The subset 22a-22n of file portions 18a-18n provided to each of the remote servers 20a-20n is generated randomly by the subset generation module 34 by selecting file portions 18a-18n associated with two or more encrypted files 14a-14n and transmitting the selected subset of file portions 18a-18n in a randomly selected order to the remote server 20a-20n. For example, at step 110, a first number of file portions 18a-18n associated with a first encrypted file 14a and a first number of file portions 18a-18n associated with a second encrypted file 14b can be selected and randomly transmitted to a first remote server 20a as subset 22a. At step 112, a second number of file portions 18a-18n associated with the first encrypted file 14a and a second number of file portions 18a-18n associated with the second encrypted file 14b can then be selected and randomly transmitted to a second remote server 20b as subset 22b. The number of remote servers 20a-20n and/or subsets 22a-22n of file portions 18a-18n may be selected randomly and/or may be predetermined.

The remote storage servers 20a-20n are configured to receive and store subsets 22a-22n of the plurality of file portions 18a-18n generated for two or more of the encrypted files 14a-14n. In some embodiments, the remote servers 20a-20n may be associated with a cloud storage provider, may be maintained by an entity associated with the device 4, and/or may be provided by a centralized organization.

In some embodiments, each of the subsets 22a-22n of file portions 18a-18n may include overlapping file portions 18a-18n. For example, a first subset 22a may include file portions 18a, 18n, a second subset 22b may include file portions 18b, 18n, and a third subset 22n may include file portions 18a, 18b. By generating overlapping subsets 22a-22n, the system 2 provides redundancy and ensures medical data files 12a-12n can be recovered even when one or more of the remote servers 20a-20n are unavailable. In some embodiments, a minimum level of redundancy is required for each subset 22a-22c of file portions 18-18n.

In some embodiments, the remote servers 20a-20n are associated with multiple entities (such as multiple cloud storage providers) and/or are located in geographically distinct locations. The exact geographic location of each of the remote servers 20a-20n may be selected by the device 4 when transmitting each subset 22a-22n of file portions 18a-18n and/or may be selected by a remote system (such as a cloud storage system) upon receiving a subset 22a-22n of file portions 18a-18n. The systems 2 and 3 may be configured to use a minimum number of remote servers 20a-20n located in a minimum number of geographically diverse locations. In some embodiments, the geographically diverse locations may be selected according to one or more rules, such as, for example, rules indicating one or more preferred geographic locations, one or more excluded geographic locations, minimum number of geographically distinct locations, and/or any other suitable criteria.

In some embodiments, a local storage module (not shown) associated with the device 4 is configured to store the encryption key and/or any other security measures applied to the encrypted files 14a-14n, a record of which file portions were transmitted to which remote servers 20a-20n, and/or any other information necessary to retrieve and/or reconstruct the digital medical files 12a-12n. The amount of local storage required is reduced using the systems 2 and 3 by eliminating the need to provide storage of medical data files 12a-12n locally.

The systems 2 and 3 can be characterized as comprising a "local" side and a "remote" side. With regards to the local side, prior to transferring digital medical data to cloud storage, local system 2 or 3 pre-processes the digital medical data. Pre-processing may include encryption of each individual file and separation of each individual file into multiple random chunks of data (e.g., random size, random portion of the file, etc.). Chunks of data from different files and different patients are transferred to the cloud storage provider in a random order (e.g., random chunks from multiple files belonging to multiple patients are mixed and transferred).

With regards to the remote side, each chunk of data is stored at a random server at a random location (e.g., location selected from multiple geographic locations) with the required redundancy selected by the remote storage provider. Reconstruction of each file is possible only by an entity possessing the local encryption key that was used during pre-processing. Local storage requirements are reduced to only maintaining local keys and/or other security measures needed to access the remote servers and remote file chunks.

In some embodiments, the remote (or cloud) side may contain servers 20a-20n that are further connected via the Internet or other network to one or more peer-to-peer networks of independent Cloud Storage Providers (ICSP) 40 for storing the subsets 22a-22n of file portions 18a-18n. Networks of ICSPs 40 are spread around different countries and different continents. These networks 40 can be of the different types.

The remote servers 20a-20n act as a bridge between systems 2, 3 and networks of ICSPs 40. Remote servers 20a-20n may be configured to provide sufficient redundancy to store client files and provide an average spread of the client files between individual providers and across countries of continents. In some embodiments, the remote servers 20a-20n are configured as a payment bridge by invoicing clients in local fiat currency while paying bills of the ICSP networks 40 in different fiat currencies or cryptographic tokens.

The remote servers 20a-20n may monitor ICSPs 40 for the availability of the stored content. In the case that an ICSP is offline for a certain period of time or stored files are not available, the remote servers 20a-20n may cancel a digital contract with that ICSP and locate files at others ICSPs by obtaining copies of the files from the redundant sources.

In some embodiments, the system 2, 3 is coupled to one or more additional systems (not shown) that do not support decentralized storage. The system 2, 3 may be configured to receive one or more files, such as video files, from the one or more additional systems and apply the disclose method of decentralized data storage described herein.

Figure 4:
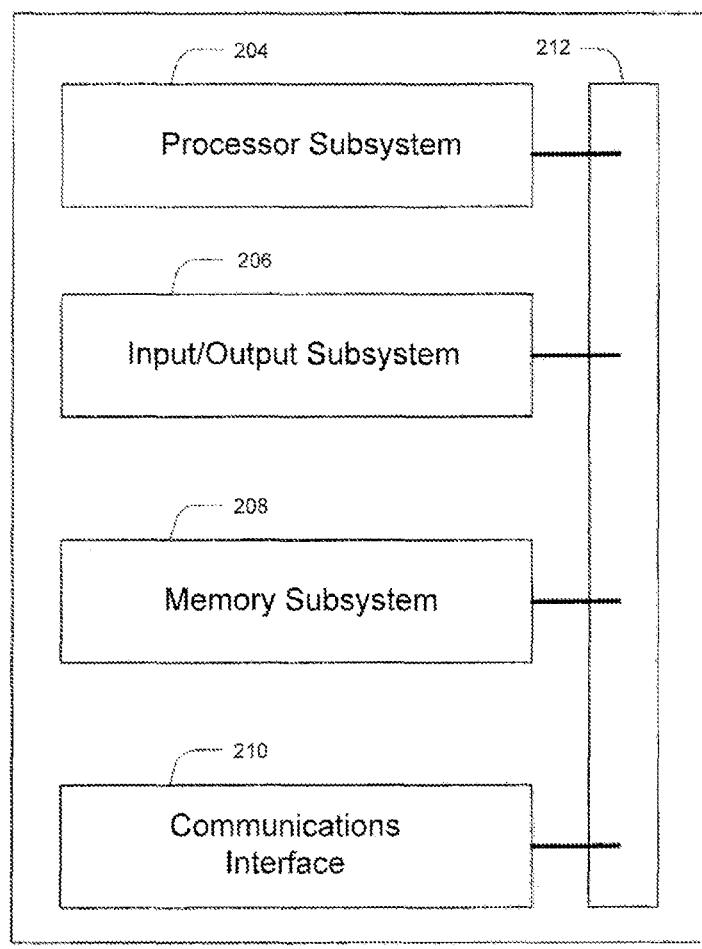
FIG. 4 is a block diagram of components for implementing the systems of FIGS. 1 and 2 and the method of FIG. 3, in accordance with an illustrative embodiment of the present invention.

FIG. 4 is a schematic diagram of components for implementing systems 2 and 3, and the functionality described above such as, for example, the encryption module 30, the partition module 32 and the subset generation module 34 of FIG. 2, in accordance with an illustrative embodiment of the present invention. The components may comprise a processor subsystem 204, an input/output subsystem 206, a memory subsystem 208, a communications interface 210, and a system bus 212. In some embodiments, one or more of the components may be combined or omitted such as, for example, omitting the communications interface 210. In some embodiments of systems 2 and 3, additional components other than those shown in FIG. 4 may be included. For example, systems 2 and 3 may also comprise a power subsystem. In other embodiments, systems 2 and 3 may comprise several instances of the components shown in FIG. 4. For example, systems 2 and 3 may comprise multiple memory subsystems 208. For the sake of conciseness and clarity, and not limitation, one of each of the components is shown in FIG. 4.

The processor subsystem 204 may comprise any processing circuitry operative to control the operations and performance of systems 2 and 3. In various aspects, the processor subsystem 204 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 204 also may be implemented by a controller, a microcontroller, an application specific integrated circuit (ASIC), a field programmable gate array (FPGA), a programmable logic device (PLD), and so forth.

In various aspects, the processor subsystem 204 may be arranged to run an operating system (OS) and various applications. Examples of an OS comprise, for example, operating systems generally known under the trade name of Apple OS, Microsoft Windows OS, Android OS, and any other proprietary or open source OS. Examples of applications comprise, for example, a telephone application, a camera (e.g., digital camera, video camera) application, a browser application, a multimedia player application, a gaming application, a messaging application (e.g., email, short message, multimedia), a viewer application, and so forth.

In some embodiments, systems 2 and 3 may comprise a system bus 212 that couples various system components including the processing subsystem 204, the input/output subsystem 206, the memory subsystem 208, and/or the communications subsystem 210. The system bus 212 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

Figure 5:
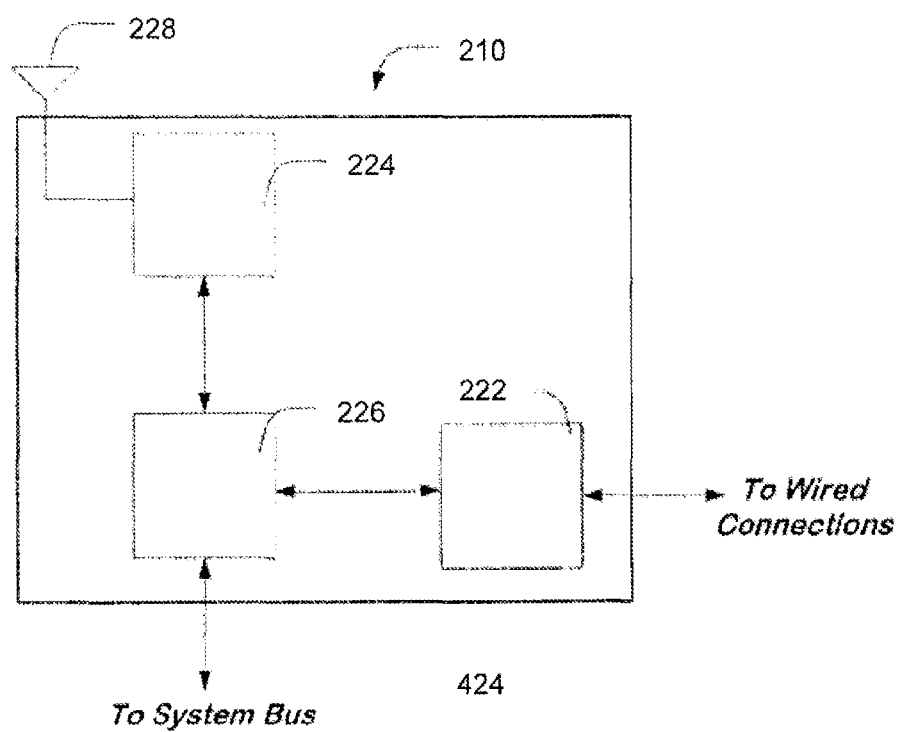
FIG. 5 is a block diagram of the communication interface of FIG. 4, in accordance with an illustrative embodiment of the present invention.

FIG. 5 shows one illustrative embodiment of the communication interface 210. The communications interface 210 may comprise any suitable hardware, software, or combination of hardware and software that is capable of coupling the system 2a to one or more networks and/or devices. The communications interface 210 may be arranged to operate with any suitable technique for controlling information signals using a desired set of communications protocols, services or operating procedures. The communications interface 210 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 210 may comprise one or more interfaces such as, for example, a wireless communications interface 222, a wired communications interface 224, a network interface, a transmit interface, a receive interface, a media interface, a system interface 226, a component interface, a switching interface, a chip interface, a controller, and so forth. When implemented by a wireless device or within wireless system, for example, the communications interface 210 may comprise a wireless interface 222 comprising one or more antennas 228, transmitters, receivers, transceivers, amplifiers, filters, control logic, and so forth.

In various aspects, the communications interface 210 may provide voice and/or data communications functionality in accordance with different types of cellular radiotelephone systems. In various implementations, the described aspects may communicate over wireless shared media in accordance with a number of wireless protocols. Examples of wireless protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In various implementations, the described aspects may comprise part of a cellular communication system. Examples of cellular communication systems may comprise CDMA cellular radiotelephone communication systems, GSM cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) wireless standards systems such as WCDMA, CDMA-2000, UMTS cellular radiotelephone systems compliant with the Third-Generation Partnership Project (3GPP), fourth generation (4G) wireless standards, and so forth.

Figure 6:
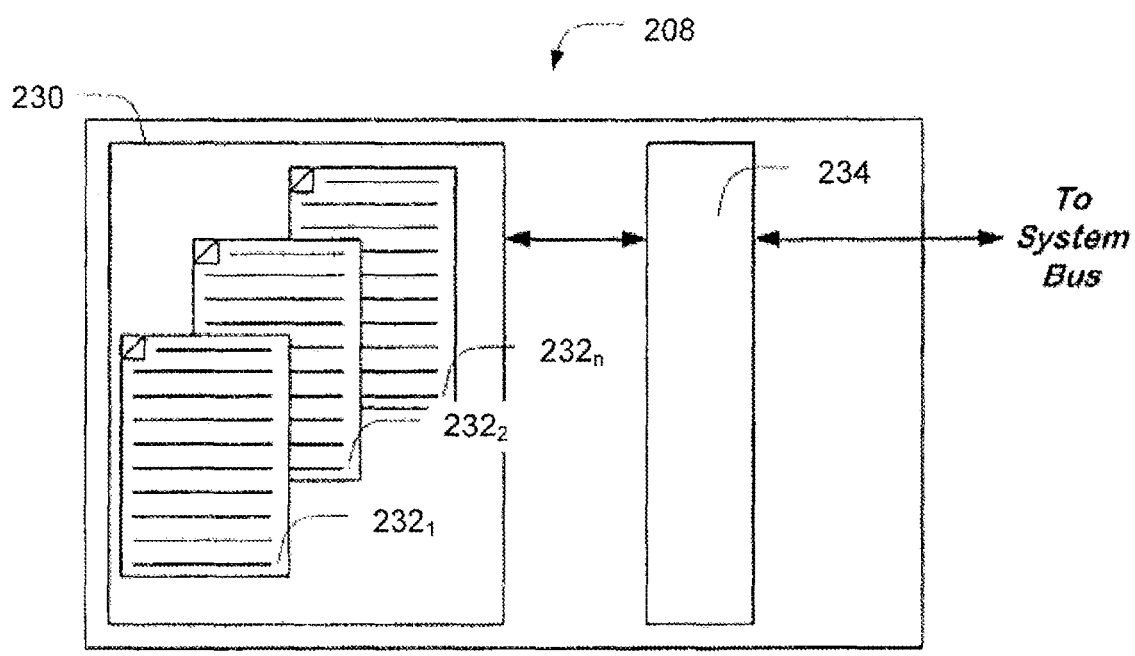
FIG. 6 is a block diagram of the memory subsystem of FIG. 4, in accordance with an illustrative embodiment of the present invention.

FIG. 6 shows an illustrative embodiment of the memory subsystem 208. The memory subsystem 208 may comprise any machine-readable or computer-readable media capable of storing data, including both volatile/non-volatile memory and removable/non-removable memory. The memory subsystem 208 may comprise at least one non-volatile memory unit 230 and a local bus 234. The non-volatile memory unit 230 is capable of storing one or more software programs 232_1-232_n. The software programs 232_1-232_n may contain, for example, applications, user data, device data, and/or configuration data, or combinations therefore, to name only a few. The software programs 232_1-232_n may contain instructions executable by the various components of systems 2 and 3.

In various aspects, the memory subsystem 208 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In some embodiments, the memory subsystem 208 may contain a software program for encrypting received medical data files, portioning medical and/or encrypted data files, and transmitting subsets of the partitioned encrypted data files using the capabilities of systems 2 and 3, as discussed in connection with FIGS. 1 and 2. In one embodiment, the memory subsystem 208 may contain an instruction set, in the form of a file 232_n for executing a method of generating and distributing a plurality of encrypted file portions for distributed storage. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming In some embodiments a compiler or interpreter is comprised to convert the instruction set into machine executable code for execution by the processing subsystem 204.

The foregoing embodiments and advantages are merely exemplary, and are not to be construed as limiting the present invention. The description of the present invention is intended to be illustrative, and not to limit the scope of the claims. Many alternatives, modifications, and variations will be apparent to those skilled in the art. Various changes may be made without departing from the spirit and scope of the invention.

What is claimed is:

1. A system for the decentralized storage of data, comprising:
   a processor;
   memory accessible by the processor;
   a set of processor readable instructions stored in the memory that are executable by the processor to:
      receive a plurality of data files,
      pre-process the plurality of data files to generate multiple subsets of encrypted data, wherein each subset of encrypted data comprises randomly selected portions of data from different data files, and
      transmit the multiple subsets of data to multiple remote servers, wherein each subset of data is sent to a randomly selected remote server;
   wherein the pre-processing the plurality of data files comprises:
      encrypting each of the plurality of data files to generate a plurality of encrypted data files;
      partitioning each of the plurality of encrypted data files to generate a plurality of encrypted data file portions;
      generating a first subset of encrypted data file portions comprising encrypted data file portions from at least two of the encrypted data files;
      generating a second subset of encrypted data file portions comprising encrypted data file portions from the two encrypted data files;
      transmitting the first subset of encrypted data file portions to a first remote server; and
      transmitting the second subset of encrypted data file portions to a second remote server.

2. The system of claim 1, wherein each of the plurality of encrypted data file portions comprises a random file portion of random length from their respective encrypted data file.

3. The system of claim 1, wherein the remote servers are geographically remote from each other.

4. The system of claim 1, wherein the first and second subsets of encrypted data file portions comprise overlapping encrypted data file portions.

5. The system of claim 1, wherein the remote servers are in communication with at least one cloud storage provider.

6. The system of claim 1, wherein each of the plurality of data files are encrypted using an encryption key.

7. The system of claim 6, wherein the encryption key is stored locally in the memory.

8. The system of claim 1, wherein the plurality of data files comprise a plurality of medical data files.

9. A system for the decentralized storage of data, comprising:
   a processor;
   memory accessible by the processor;

a set of processor readable instructions stored in the memory that are executable by the processor to:
  receive a plurality of data files,
  pre-process the plurality of data files to generate multiple subsets of encrypted data, wherein each subset of encrypted data comprises randomly selected portions of data from different data files, and
  transmit the multiple subsets of data to multiple remote servers, wherein each subset of data is sent to a randomly selected remote server;
wherein the pre-processing the plurality of data files comprises:
  partitioning each of the plurality of data files to generate a plurality of data file portions;
  encrypting each of the plurality of data file portions to generate a plurality of encrypted data file portions;
  generating a first subset of encrypted data file portions comprising encrypted data file portions from at least two of the encrypted data files;
  generating a second subset of encrypted data file portions comprising encrypted data file portions from the two encrypted data files;
  transmitting the first subset of encrypted data file portions to a first remote server; and
  transmitting the second subset of encrypted data file portions to a second remote server.

10. A method for the decentralized storage of data, comprising:
  receiving a plurality of data files;
  pre-processing the plurality of data files to generate multiple subsets of encrypted data, wherein each subset of encrypted data comprises randomly selected portions of data from different data files; and
  transmitting the multiple subsets of data to multiple remote servers, wherein each subset of data is sent to a randomly selected remote server;
wherein pre-processing the plurality of data files comprises:
  encrypting each of the plurality of data files to generate a plurality of encrypted data files;
  partitioning each of the plurality of encrypted data files to generate a plurality of encrypted data file portions;
  generating a first subset of encrypted data file portions comprising encrypted data file portions from at least two of the encrypted data files;
  generating a second subset of encrypted data file portions comprising encrypted data file portions from the two encrypted data files;
  transmitting the first subset of encrypted data file portions to a first remote server; and
  transmitting the second subset of encrypted data file portions to a second remote server.

11. The method of claim 10, wherein each of the plurality of encrypted data file portions comprises a random file portion of random length from their respective encrypted data file.

12. The method of claim 10, wherein the remote servers are geographically remote from each other.

13. The method of claim 10, wherein the first and second subsets of encrypted data file portions comprise overlapping encrypted data file portions.

14. The method of claim 10, wherein the remote servers are in communication with at least one cloud storage provider.

15. The method of claim 10, wherein each of the plurality of data files are encrypted using an encryption key.

16. The method of claim 15, wherein the encryption key is stored locally in the memory.

17. The method of claim 10, wherein the plurality of data files comprise a plurality of medical data files.

18. A method for the decentralized storage of data, comprising:
  receiving a plurality of data files;
  pre-processing the plurality of data files to generate multiple subsets of encrypted data, wherein each subset of encrypted data comprises randomly selected portions of data from different data files; and
  transmitting the multiple subsets of data to multiple remote servers, wherein each subset of data is sent to a randomly selected remote server;
wherein the pre-processing the plurality of data files comprises:
  partitioning each of the plurality of data files to generate a plurality of data file portions;
  encrypting each of the plurality of data file portions to generate a plurality of encrypted data file portions;
  generating a first subset of encrypted data file portions comprising encrypted data file portions from at least two of the encrypted data files;
  generating a second subset of encrypted data file portions comprising encrypted data file portions from the two encrypted data files;
  transmitting the first subset of encrypted data file portions to a first remote server; and
  transmitting the second subset of encrypted data file portions to a second remote server.

* * * * *